Aug. 31, 1948.    W. C. GRABAU    2,448,025
SELF-SYNCHRONOUS CONTROLLED MOTOR SYSTEM
Filed July 9, 1942    2 Sheets-Sheet 1

INVENTOR
WILLIAM CHRISTIAN GRABAU
BY
ATTORNEY

HAND CONTROL    FIG. 1

Aug. 31, 1948.          W. C. GRABAU          2,448,025
SELF-SYNCHRONOUS CONTROLLED MOTOR SYSTEM
Filed July 9, 1942                        2 Sheets-Sheet 2

INVENTOR
WILLIAM CHRISTIAN GRABAU
BY
ATTORNEY

Patented Aug. 31, 1948

2,448,025

UNITED STATES PATENT OFFICE 2,448,025

SELF-SYNCHRONOUS CONTROLLED MOTOR SYSTEM

William Christian Grabau, Brighton, Mass., assignor, by mesne assignments, to Submarine Signal Company, Boston, Mass., a corporation of Delaware Application July 9, 1942, Serial No. 450,329

6 Claims. (Cl. 318—30)

The present invention relates to a training control system for rotating and directing a rotatable element at varying speeds and to varying positions. The system is more particularly applicable to the control with the use of an alternating current source and may be applied for training searchlights, radio locators, signaling devices and guns.

One advantage in the present system is that great accuracy is obtained by the elimination of the lag or slack in the system. In the present application the training motor driving the element to be trained follows directly and without delay the training of the hand-controlled element. This, in part, is accomplished by the use of a balanced system in which current flows under normal operating conditions through the driving elements in both directions and the operation and drive are obtained by the increase of current flow in one direction over that in the other direction so that there is no necessity and no time delay in the building up of the initial current flow in the circuit. This balancing effect is particularly important in the present application because the control must be able to rotate the training gear in what may be called a forward and a reverse direction.

Further advantage is obtained in the present system because of the rapidity of action between the operating hand control and the circuits controlling the driving machine as will be more clearly understood from the description in the specification below. In this respect the present invention incorporates in part some of the features disclosed and claimed in my copending application Serial No. 432,982, filed March 2, 1942, now Patent No. 2,352,626, issued July 4, 1944.

Figure 1:
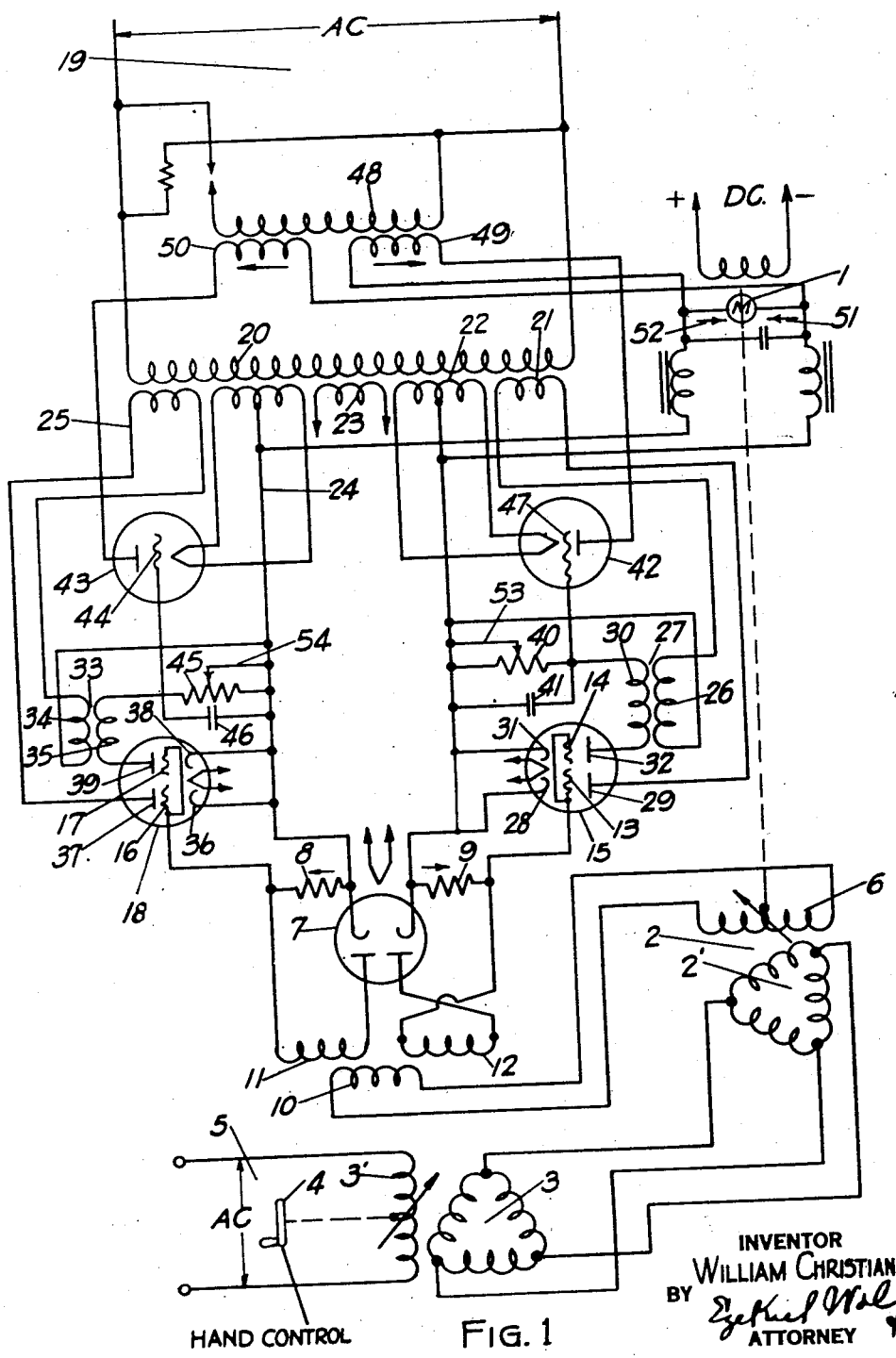
Figure 2:
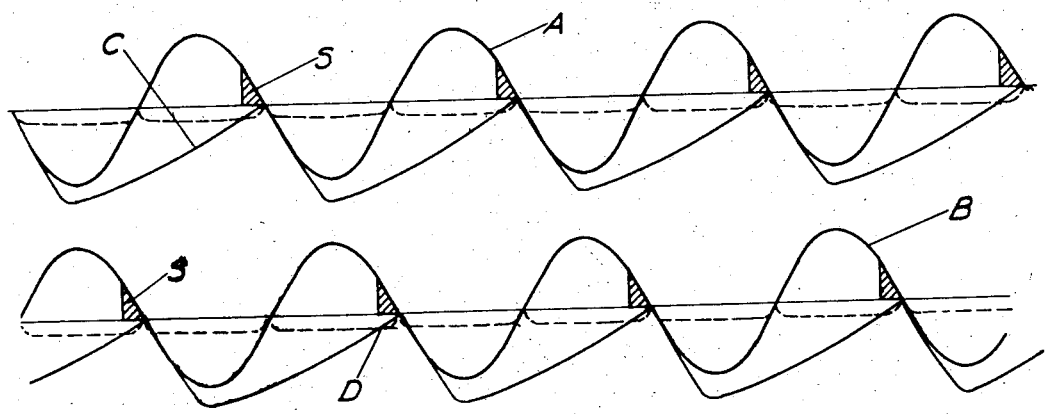
Figure 3:
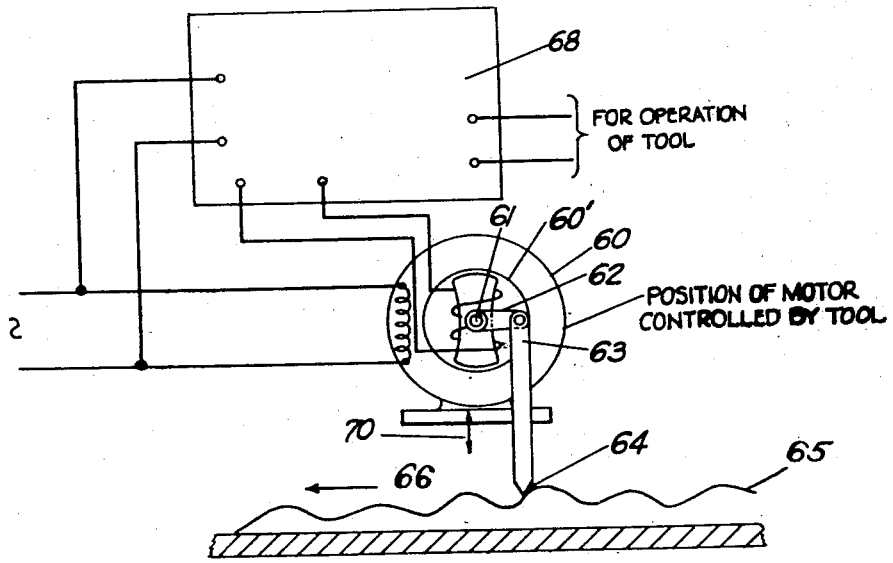

Further merits and advantages of the present invention will be more clearly understood in connection with the drawings illustrating an embodiment of the invention in which Fig. 1 shows a diagrammatic arrangement of the invention; Fig. 2 illustrates a set of curves applicable to the operation of the circuit of Fig. 1; and Fig. 3 shows a modified application of the invention to a machine tool.

In the drawing, the driving motor I represented at M may drive the training apparatus which may, of course, be a searchlight, radio locator or submarine signaling apparatus. Driven on the same shaft with the motor I is the self-synchronous repeater 2 with a stator 2' which is electrically connected with the self-synchronous generator stator 3 in which a voltage is induced by means of the winding 3' whose relative position with respect to stator 3 is controlled by the operating crank 4. This generator is, of course, energized by an alternating current supply 5 in the usual manner. The rotor 6 of the motor 2 is relatively the same element as the rotor 3' so that when rotor 6 and the hand-operated rotor 3' have the same phase displacement, no voltage will be supplied to the output transformer 10 of the repeater system. Under this condition the voltage developed by the double rectifier 7 will be zero and therefore there will be no bias on the grids 13 and 16 from repeater 2 and the generator 3. When there is a displacement between 6 and 3', a voltage is developed in the winding 10 and therefore the transformer is energized so that a voltage exists across both secondaries 11 and 12 in which case both grids 13 and 14 of the double triode 15 and the grids 16 and 17 of the double triode 18 will become negatively biased. When no bias exists on 13 and 16, a normal balanced condition prevails in which the driving motor I is at rest. The double triodes 15 and 18, which are preferably of the thermionic type, have their anode-cathode voltage supplied from the alternating current source 19 which may be the same alternating source as the source 5 through the transformer 20 which has several secondaries 21, 22, 23, 24 and 25. The secondaries 21 and 25 supply, respectively, the cathode-anode voltages for the tubes 15 and 18 in a manner that will presently be described. For the tube 15 the secondary winding 21 is connected in series with the primary 26 of a transformer 27. This primary winding 26 and the transformer winding 21 are in series with the cathode 28 and the anode 29 of the tube 15 while the secondary 30 of the transformer 27 is in series with the cathode 31 and the anode 32 of the tube 15. The same arrangement is applied to the tube 18, the transformer 33 operating in the same manner as the transformer 27 with a primary 34 and a secondary 35, the primary 34 being in the series circuit with the cathode 36 and anode 37 while the secondary 35 is in series with the cathode 38 and the anode 39. When a normal current is flowing across the tube 15 between the anode 29 and the cathode 28, the voltage developed across the secondary 21 is partly distributed across the primary 26 of the transformer 27 and across the cathode-anode drop in the tube 15. Since the transformer 27 has approximately a one to one ratio, the same voltage is developed between the anode 32 and the cathode 31 as across the primary 26 of the transformer 27.

When the displacement of the winding 6 of the repeater motor varies with respect to that of the winding 3', a voltage will be generated across the transformer 10 which will produce a voltage drop in the resistances 8 and 9 of the rectifier 7, and thereby increase the negative bias on the grids 13 and 14 of the tube 15, and 16 and 17 of the tube 18. Since the voltage is applied in opposite phases to the cathode-anode circuits of the tubes 15 and 18, this negative bias will tend to shut off the flow of current in one of the tubes 15 or 18 and therefore decrease the voltage developed across the primary 26 or 34 of the transformer 27 or 33, respectively, applying most of the voltage generated in the secondary winding 21 or 25 across the cathode-anode 28—29 or 36—37. This decrease in voltage in the transformer 27, for instance, will directly decrease the voltage applied between the cathode 31 and the anode 32, and together with the increase in the negative bias on the grid 14 will sharply decrease the cathode-anode current flowing between 31 and 32. The output of this tube flows through a resistance-condenser circuit 40 and 41, respectively, the resistance of which controls the bias on the gaseous control tube 42. In a similar manner when the displacement between 6 and 3' is in the opposite phase, the control tube 43 has its bias 44 controlled by means of the resistance 45 and condenser 46 connected in shunt in the cathode-anode circuit 38—39 of the tube 16. The grids 47 and 44 of the tubes 42 and 43, respectively, are therefore controlled by the output circuits of the tubes 15 and 18, respectively, according to the direction of displacement and an increase in grid bias developed by an increase in a voltage output of the rectifier 7 will tend to decrease sharply the bias applied to the grids 47 and 44 of the tubes 42 and 43, respectively, in the manner that has been described in my Patent No. 2,352,626 mentioned above. The slope of this decaying voltage at one or the other of the grids 47 and 44 becomes steeper with increase of operating displacement voltage. The anode-cathode circuits of the control tubes 42 and 43 are supplied by means of the transformer 48, the secondaries 49 and 50 of which supply respectively the tubes 42 and 43. Whenever the biases on the grids 47 and 44 decrease below the critical value during the positive alternative voltage cycle on the tubes 42 and 43 respectively, the tubes will permit the flow of current and then the circuit is completed through the armature of the motor 1 and thereby the training gear may be turned in one direction or the other.

The direction of rotation of the motor 1 is governed by the relative positions of the rotor 3' of the self-synchronous generator 3 and the rotor 6 of the motor 2. The voltages impressed upon the cathode-anode circuits of the conduction tubes 42 and 43 as well as those impressed on the tubes 15 and 18 are 180 degrees out of phase with each other so that the biases on the grids 47 and 44 simultaneously operating in the same fashion will permit conduction only in one of the two conduction tubes. In one relative position of the rotor 3' and the rotor 6, one decaying voltage either on the grid 47 or 44 will be altered by the change of displacement voltage produced in the resistances 8 or 9, in which case the voltage on the selected grid 47 or 44 will cooperate with the positive half cycle in one tube, whereas in the other relative position between the rotor 3' and the rotor 6, the voltage on the other of the grids 47 or 44 will cooperate with the positive voltage on its conduction tube.

This is illustrated in Fig. 2. In this case A may represent the cathode-anode voltage applied across the tube 42 and B the cathode-anode voltage applied across the tube 43. The normal decaying voltage developed on the grids 47 and 44 is in the form shown in curve C or curve D, respectively, when there is no displacement voltage. When there is a displacement voltage in either direction, then the curve C or D is steepened and cuts the critical grid voltage curve earlier in the cycle, causing the conduction to fire over a longer period of the cycle. It should be borne in mind that the phases do not change but only their selection and magnitude which are dependent on the relative position of the rotor 6 and rotor 3'.

The potentiometer adjustments 53 and 54 are used to adjust the magnitude of the voltage applied to the grids 47 and 44 as has been explained. These adjustments may be so made that the decaying grid voltage always permits a small amount of current to flow at the end of each positive half cycle as illustrated by the shaded sections S in the figures of Curves A and B. This will provide a definite balance when the motor is not moving and has the effect of causing the motor to follow the training gear accurately when the hand control turns the generator rotor 3' in either direction. In the present system the training gear will follow the control even at very slow speeds with an accuracy of less than one-half a degree displacement between the control and the controlled element.

It will be noted by following through the circuit diagram that the secondary winding 49 is in series with the motor 1 and the tube 42 so that when the tube 42 fires, current will flow through the motor 1 in the direction of the arrow 51. It will also be noted that the winding 50 is in series with the tube 43 and the motor 1 and that when the grid 44 permits this tube to conduct current, current will flow through the motor 1 in the direction of the arrow 52.

In Fig. 3 there is shown a special application of the arrangement shown in Fig. 1. In this case the self-synchronous control element is indicated at 60. This is mounted to move with the movable tool element of the machine up or down according to the double-ended arrow 70. The rotor 60' is provided with a shaft 61 which has a point 64 bearing on the surface 65 of a movable template to which the movement of the tool corresponds. The surface may be moved in the direction of the arrow 66, in which case the angular position of the rotor 60' will be changed corresponding to the upward and downward motion of the bar 63, the tool following the point 64 until it has been brought to relatively the same position as the point 64. Under these circumstances when the bar 63 is raised, the displacement of the rotor 60' attached to the shaft 61 from a neutral position will bring about a movement of the tool and correspondingly of the whole motor tending to return the rotor 60' the same angular displacement to its neutral position where it comes to rest.

Since the magnitude of the displacement of the rotor with respect to its stator governs the amplitude of the voltage produced, the speed of rotation will be governed by the displacement between the rotor 60' and its stator. This will be evident from the circuit of Fig. 1. The relative displacement of the generator winding 3 with respect to the winding 6 will produce relatively higher voltages developed across the resistances 8 and 9 and this will react to cause a quicker decay of the voltage in the resistors 40 and 45 and therefore permit conduction earlier in the cycle in one of the tubes 42 or 43. The same operative feature applies to Fig. 3 where an increase in displacement caused by the point 64 or bar 63 being carried higher by the surface of the template 65, will produce a greater displacement voltage in the self-synchronous generator and therefore a higher speed acting on the tool to restore the elements to their neutral position.

Having now described my invention, I claim:

1. In a training control and follow-up system, gaseous conduction tube means having grid control elements, thermionic vacuum tube means and circuit operative to provide control of said grid control elements comprising double triode tube means having double anode and cathode elements, an alternating current source providing a potential across one set of anode and cathode elements dependent upon the conduction across the other set of anode-cathode elements, said double triode having grid control elements and means operative by said system for supplying a controlling voltage to said grid control elements for governing the conduction across said triode elements, and means in the output of said double triode tube means for controlling the potential applied to said grid control elements of said gaseous conduction tube means.

2. In a training control and follow-up system operable through an alternating current source providing a displacement alternating voltage for control and operation of the system, double triode tube means and circuits comprising two sets of anode, cathode and grid control electrodes, means for impressing an alternating voltage across the first set of cathode and anode elements, means dependent on said alternating voltage impressed on the first set of cathode and anode elements for impressing a second alternating voltage on the second set of cathode and anode elements, said second alternating voltage having an increasing magnitude characteristic with the decreasing of said first alternating voltage, and means for converting said displacement alternating voltage to direct current pulses and impressing the same on said triode grid elements for controlling the flow of current through said double triode tube.

3. In a training control and follow-up system operable through an alternating current source providing a displacement alternating voltage for control and operation of the system, double triode tube means and circuits comprising two sets of anode, cathode and grid control electrodes, means for impressing on the anode-cathode circuit of the first triode set an alternating voltage, said circuit having a transformer in series connection in said circuit with a secondary in the anode-cathode circuit of said second triode set, and means for converting said displacement alternating voltage to direct current pulses and impressing the same on said triode grid elements for controlling the flow of current through said double triode tubes.

4. In a training control and follow-up system providing a displacement alternating voltage for controlling the operation of the system, a pair of double triode tube means and circuits each comprising two sets of anode, cathode and grid control electrodes, means energizing said grid control electrodes from said displacement alternating voltage, means for impressing an alternating voltage source across each first set of cathode and anode elements of said double triode tube means, means dependent upon said alternating voltage for impressing a second alternating voltage on each of the second sets of cathode and anode elements, said second alternating voltage having an increasing magnitude characteristic with the decreasing of said first alternating voltage, a pair of gaseous conduction tubes having grid control elements, an alternating current source adapted to provide a potential across said pair of gaseous conduction tubes in opposing phases, and means for impressing the output of said double triode tube means upon the grid control elements of said gaseous tubes whereby the direction of current in the training control system may be selected.

5. In a training control and follow-up system providing a displacement alternating voltage for control and operation of the system, double triode tube means and circuits comprising two sets of anode, cathode and grid control electrodes, means for impressing on the anode-cathode circuit of the first triode set an alternating voltage, said circuit having a transformer in series connection in said circuit with a secondary in the anode-cathode circuit of said second triode set, a shunt circuit comprising a condenser and resistance connected in series in the anode-cathode circuit of said second triode set, a gaseous conduction tube means for controlling the flow of current in one direction in said training control, said gaseous conduction tube means having a grid control element, and means for controlling the potential of said grid control element by the voltage decay in said resistance member.

6. In a training control system, a training motor, gaseous conduction tube means having a pair of anodes, cathodes and grid control elements, means for applying an alternating voltage source in opposing phases to said conduction tube means in series with the training motor, a training member for providing a displacement alternating voltage for controlling the direction of rotation of the training motor in a forward or reverse direction, double triode tube means and circuits comprising two sets of anodes, cathodes and grid control electrodes, means for impressing on the anode-cathode circuit of the first triode set a direct current pulse, means dependent upon said pulse for impressing a second pulse on the second set of cathode and anode elements, said second pulse having an increasing magnitude characteristic with the decreasing of said first pulse, means for converting said displacement alternating voltage to provide said first-mentioned direct current pulses and impressing the same on said triode grid elements for controlling the flow of current through said double triode tube and means for impressing the output of said double triode tube on the grids of said conduction tube means for operating said training motor.

WILLIAM CHRISTIAN GRABAU.

REFERENCES CITED

The following references are of record in the file of this patent:

UNITED STATES PATENTS

| Number | Name | Date |
| --- | --- | --- |
| 1,684,137 | Mittag | Sept. 11, 1928 |
| 1,998,938 | Mittag | Apr. 23, 1935 |
| 2,108,038 | Balmford | Feb. 15, 1938 |
| 2,116,593 | Bouvier et al. | May 10, 1938 |
| 2,131,759 | Satterlee | Oct. 4, 1938 |
| 2,147,674 | Satterlee | Feb. 21, 1939 |
| 2,153,986 | MacLaren | Apr. 11, 1939 |
| 2,217,399 | Edwards | Oct. 8, 1940 |
| 2,260,977 | Jones | Oct. 28, 1941 |
| 2,263,764 | Elberty et al. | Nov. 25, 1941 |
| 2,307,503 | Gulliksen | Jan. 5, 1943 |
| 2,364,483 | Side | Dec. 5, 1944 |